United States Patent
Brown et al.

(10) Patent No.: US 6,906,300 B2
(45) Date of Patent: Jun. 14, 2005

(54) CONSOLIDATION DEVICE AND METHOD

(75) Inventors: Ronald W. Brown, Des Moines, WA (US); Marc R. Matsen, Seattle, WA (US); Wesley B. Crow, Bellevue, WA (US); Stephen G. Moore, Seattle, WA (US); David S. Nansen, Bellevue, WA (US); Charles W. Newquist, Issaquah, WA (US); Juris Verzemnieks, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/640,454

(22) Filed: Aug. 13, 2003

(65) Prior Publication Data
US 2005/0035116 A1 Feb. 17, 2005

(51) Int. Cl.⁷ .................................................. H05B 6/64
(52) U.S. Cl. ........................ 219/759; 219/602; 219/633
(58) Field of Search .............................. 219/602, 759, 219/634, 649, 615, 633, 645, 618; 428/633, 675, 621; 228/56.1, 122.1, 124.1; 29/419.1

(56) References Cited

U.S. PATENT DOCUMENTS

| | | | |
|---|---|---|---|
| 4,173,611 A | 11/1979 | Benson et al. | |
| 5,229,562 A | 7/1993 | Burnett et al. | |
| 5,278,377 A | * 1/1994 | Tsai | 219/759 |
| 5,338,497 A | 8/1994 | Murray et al. | |
| 5,410,133 A | 4/1995 | Matsen et al. | |
| 5,530,227 A | 6/1996 | Matsen et al. | |
| 5,530,228 A | 6/1996 | Burnett et al. | |
| 5,582,849 A | 12/1996 | Lupke | |
| 5,591,369 A | 1/1997 | Matsen et al. | |
| 5,591,370 A | 1/1997 | Matsen et al. | |
| 5,645,744 A | 7/1997 | Matsen et al. | |
| 5,645,747 A | 7/1997 | Matsen et al. | |
| 5,683,608 A | 11/1997 | Matsen et al. | |
| 5,710,414 A | 1/1998 | Matsen et al. | |
| 5,728,309 A | 3/1998 | Matsen et al. | |
| 5,747,179 A | * 5/1998 | Matsen et al. | 428/586 |
| 5,808,281 A | 9/1998 | Matsen et al. | |
| 6,087,640 A | * 7/2000 | Gillespie et al. | 219/615 |
| 6,180,932 B1 | 1/2001 | Matsen et al. | |
| 6,528,771 B1 | 3/2003 | Matsen et al. | |

* cited by examiner

Primary Examiner—Quang T. Van
(74) Attorney, Agent, or Firm—Alston & Bird LLP

(57) ABSTRACT

An apparatus and method for consolidating a composite workpiece are provided. The apparatus includes an electromagnetic field generator for inducing a current and thereby heating a susceptor in thermal communication with the workpiece. The workpiece is supported by one or more support tools, each of which transmits the electromagnetic field so that the support tools are not substantially heated by the electromagnetic field. Thus, the time and energy required for heating the workpiece are reduced relative to conventional consolidation techniques.

15 Claims, 5 Drawing Sheets

CONSOLIDATION DEVICE AND METHOD

BACKGROUND OF THE INVENTION

1) Field of the Invention

The present invention relates to composite materials and, more particularly, relates to the consolidation of composite material by inductively heating the material and applying pressure thereto.

2) Description of Related Art

Composite materials typically include a fibrous material such as graphite that is interspersed in, or impregnated with, a matrix material. The fibrous material is generally strong and stiff and is held in place by the matrix material, which can be formed of a thermoplastic resin, a thermoset resin, or a metal. In combination, the fiber and matrix materials can provide a strong, stiff, lightweight material, which can also have dimensionally specific properties. Examples of composite materials include alumina-, boron-, or silicon carbide-based fibers provided in a weave, braid, or non-woven arrangement and combined with a matrix formed of Ultem® resin, a registered trademark of General Electric Company, or a metal such as titanium or aluminum.

Composite materials are consolidated during conventional manufacture by any of a number of methods such as vacuum hot pressing or hot isostatic pressing. These processes typically require long heat cycles due to the heating and cooling required for the tooling that is used to heat and consolidate the composite materials. The time and energy requirements result in high manufacture costs. U.S. Pat. No. 5,229,562 to Burnett, et al. and assigned to the assignee of the present invention, describes a manufacturing method for a composite workpiece in which an electrically conductive support is used to support the workpiece. The support is inductively heated, and thermal energy is conducted from the support to the workpiece. The mass and shape of the support can be controlled so that the workpiece can be heated evenly to a temperature sufficient for consolidation. However, the energy required to inductively heat the support adds to the manufacturing cost of the composite workpiece. In addition, temperature changes in the support can cause dimensional variations, thereby affecting the finished shape of the workpiece. Further, the time required for cooling the support between consolidation operations increases the manufacturing time for the workpieces.

Thus, there exists a need for an improved apparatus and method for consolidating a composite material. The apparatus and method should be capable of heating and cooling the composite material quickly to and from a temperature sufficient for consolidation. Preferably, the apparatus and method should not require that large support members are heated and cooled during each cycle.

BRIEF SUMMARY OF THE INVENTION

The present invention provides an improved apparatus and method for consolidating a composite workpiece. The workpiece is heated by inducing a current in a susceptor. The current is induced by an electromagnetic field, which is transmitted through one or more support tools that support the workpiece. The electromagnetic field does not induce significant electrical current in the support tools, and the support tools are not substantially heated, thus reducing the energy required for heating the workpiece and reducing the time required for cooling the support tools. Further, the workpiece can be heated accurately and uniformly to a processing temperature.

According to one embodiment of the present invention, the apparatus includes at least two consolidation rollers configured to form a nip therebetween for receiving the workpiece. At least one support tool is configured to support the workpiece in the nip, and at least one susceptor is disposed between the workpiece and the support tool so that the susceptor is in thermal communication with the workpiece. An electromagnetic field generator, such as an induction coil, is configured to generate an electromagnetic field for inducing the current in the susceptor and heating the susceptor and the workpiece to the processing temperature at which the workpiece can be consolidated in the nip. For example, each susceptor can be heated to a Curie temperature above which the susceptor becomes paramagnetic. Each support tool can be formed of a plurality of members, such as metal plates, that extend in a direction parallel to a direction of motion of the workpiece through the nip. An insulative material can be provided between the members to prevent electrical conduction therebetween. Actuators rotate the rollers to advance the workpiece and urge the rollers together to consolidate the workpiece.

According to one aspect of the invention, the support tools are provided as support tracks, which can extend endlessly around the consolidation rollers. Each susceptor can also be provided as an endless sheet. Thus, a continuous workpiece can be advanced through the apparatus and consolidated. One or more engagement tracks can be provided for engaging the transverse edges of the susceptors into electrical contact so that the current induced in the susceptors flows therebetween. Each engagement track can include an inflatable bladder.

The present invention also provides a method of consolidating a workpiece. The method includes providing the support tools in a face-to-face, opposing relationship and disposing at least one susceptor and the workpiece between the support tools. The workpiece can be disposed as preimpregnated tapes, and the workpiece, susceptor, and support tools can be provided as continuous or endless members or tracks. An electromagnetic field is generated to induce an electric current in the susceptors and heat the susceptors and the workpiece to a processing temperature. For example, an induction coil can be used to heat the susceptor to its Curie temperature, thereby heating the workpiece to a processing temperature for consolidation. The electromagnetic field is substantially transmitted through the support tools. The workpiece is consolidated, for example, by advancing the workpiece, susceptors, and support tools through a nip between rollers.

BRIEF DESCRIPTION OF THE SEVERAL VIEWS OF THE DRAWINGS

Figure 1:
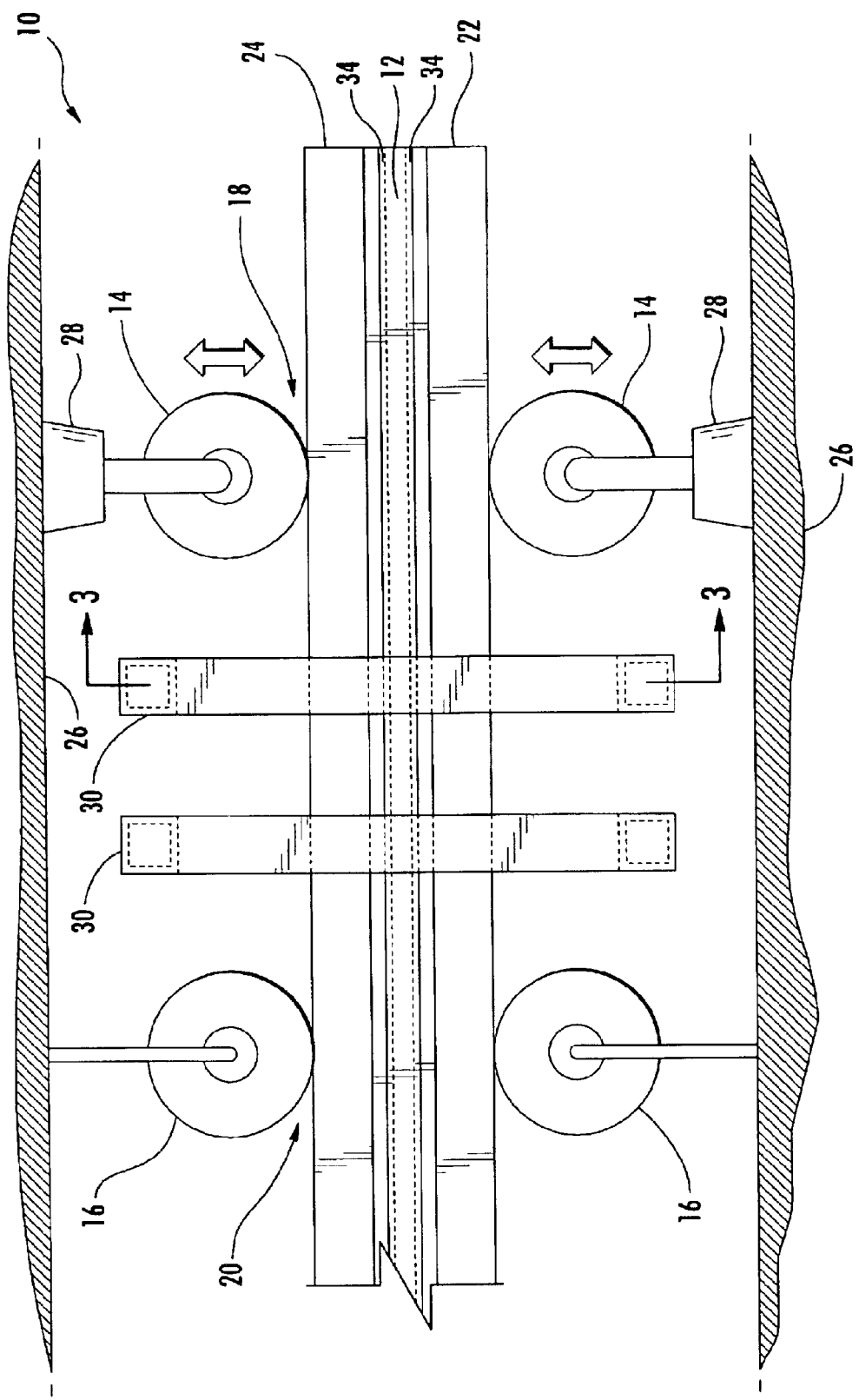
Figure 2:
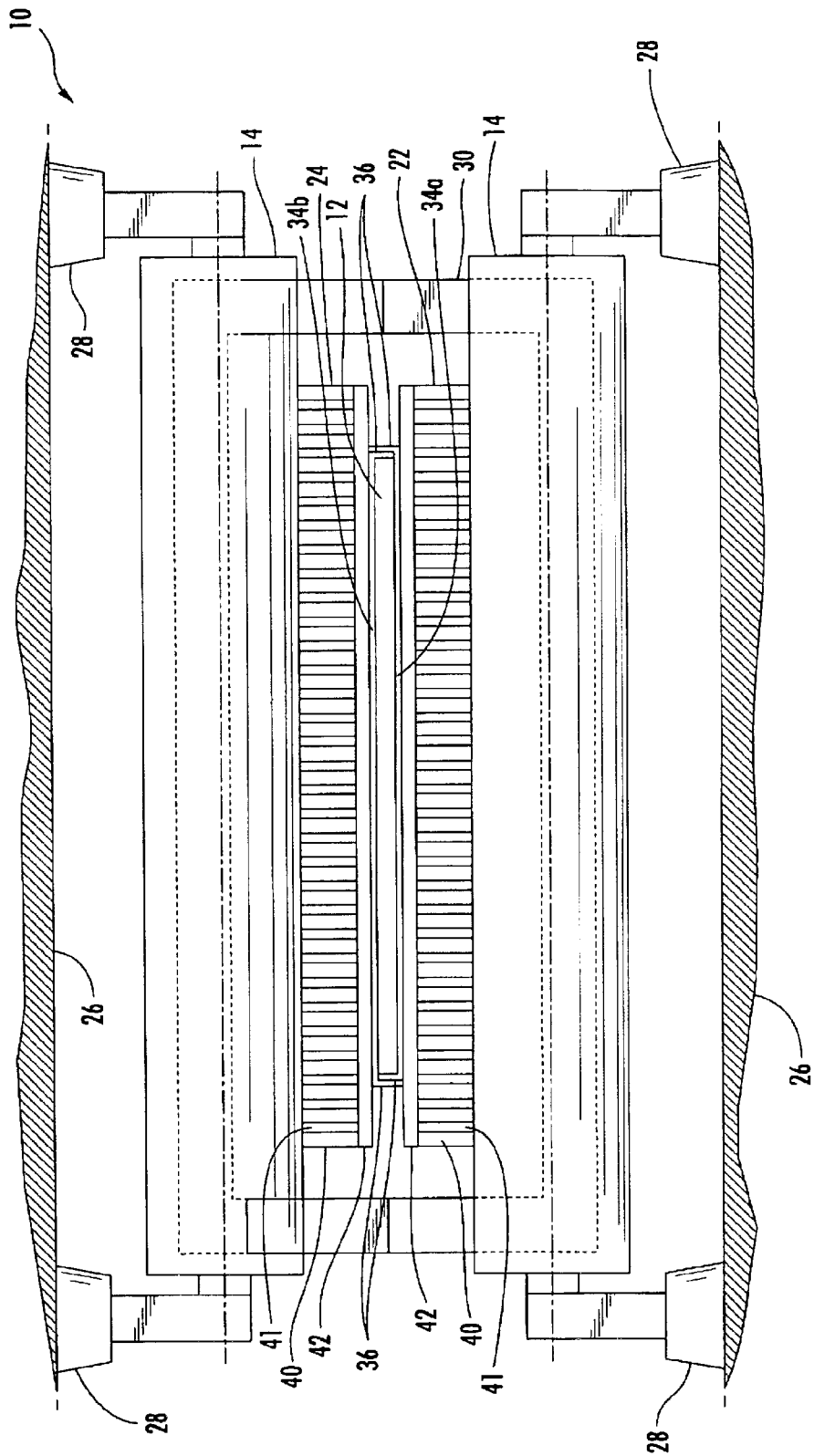
Figure 3:
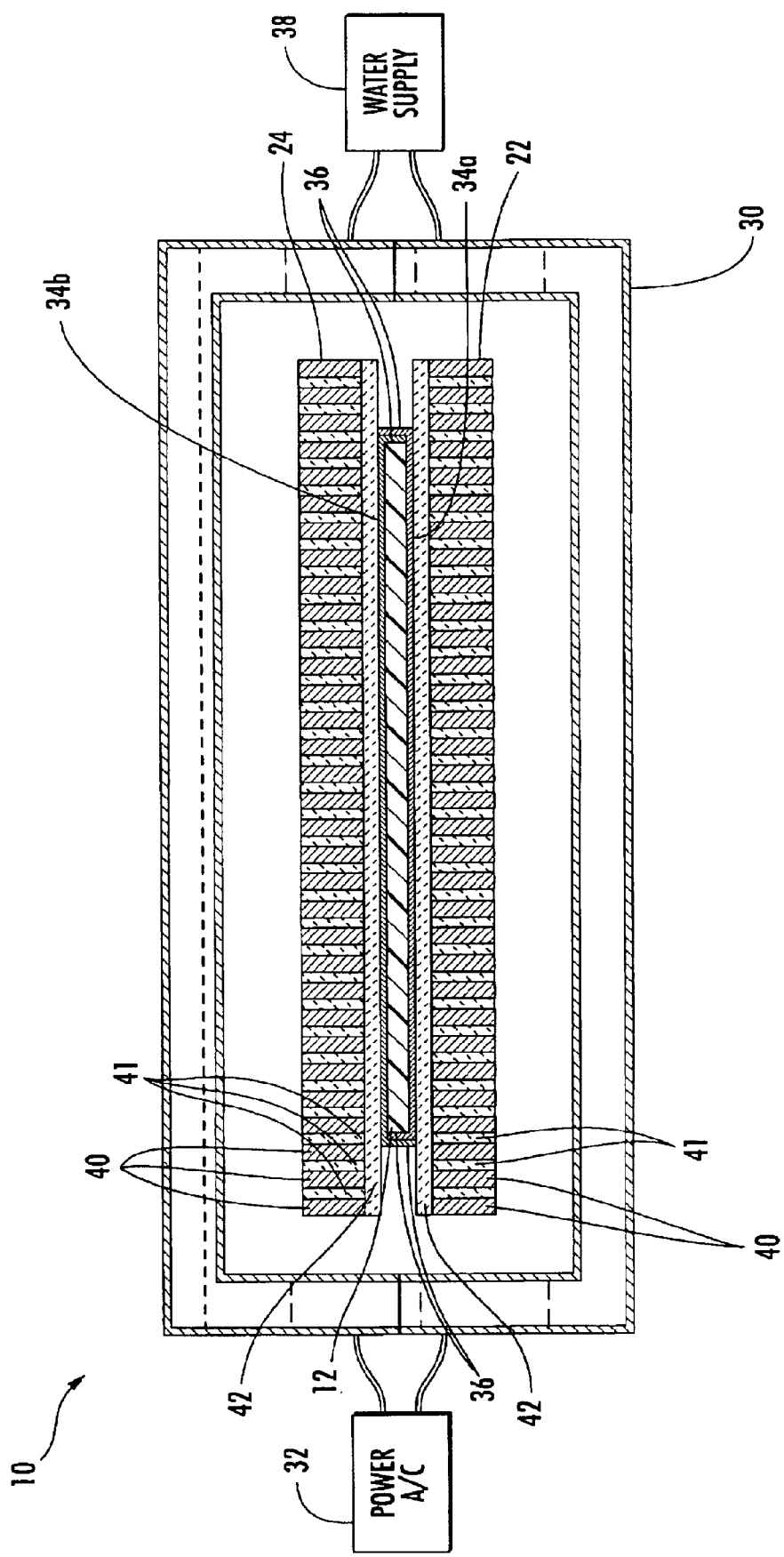
Figure 4:
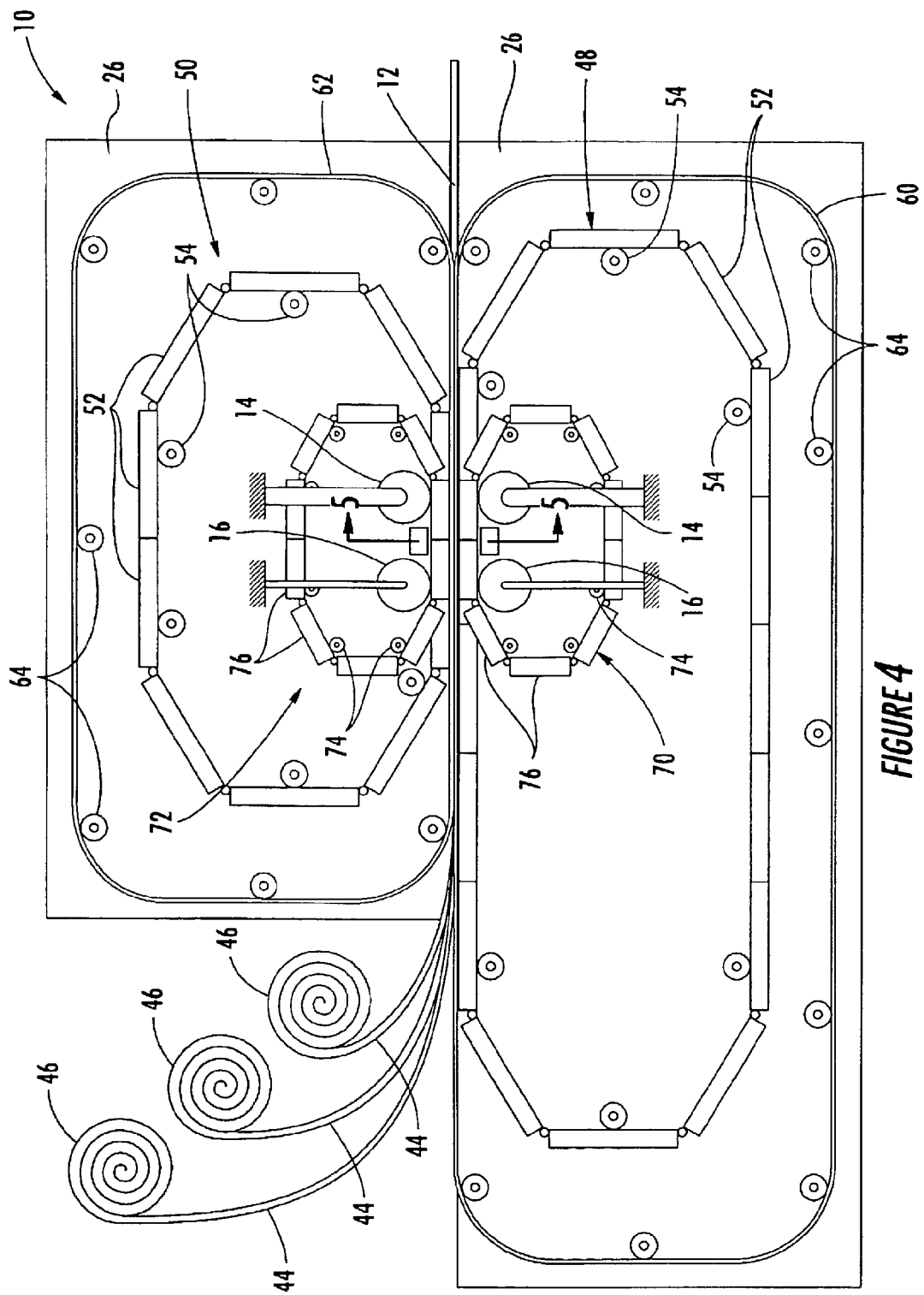
Figure 5:
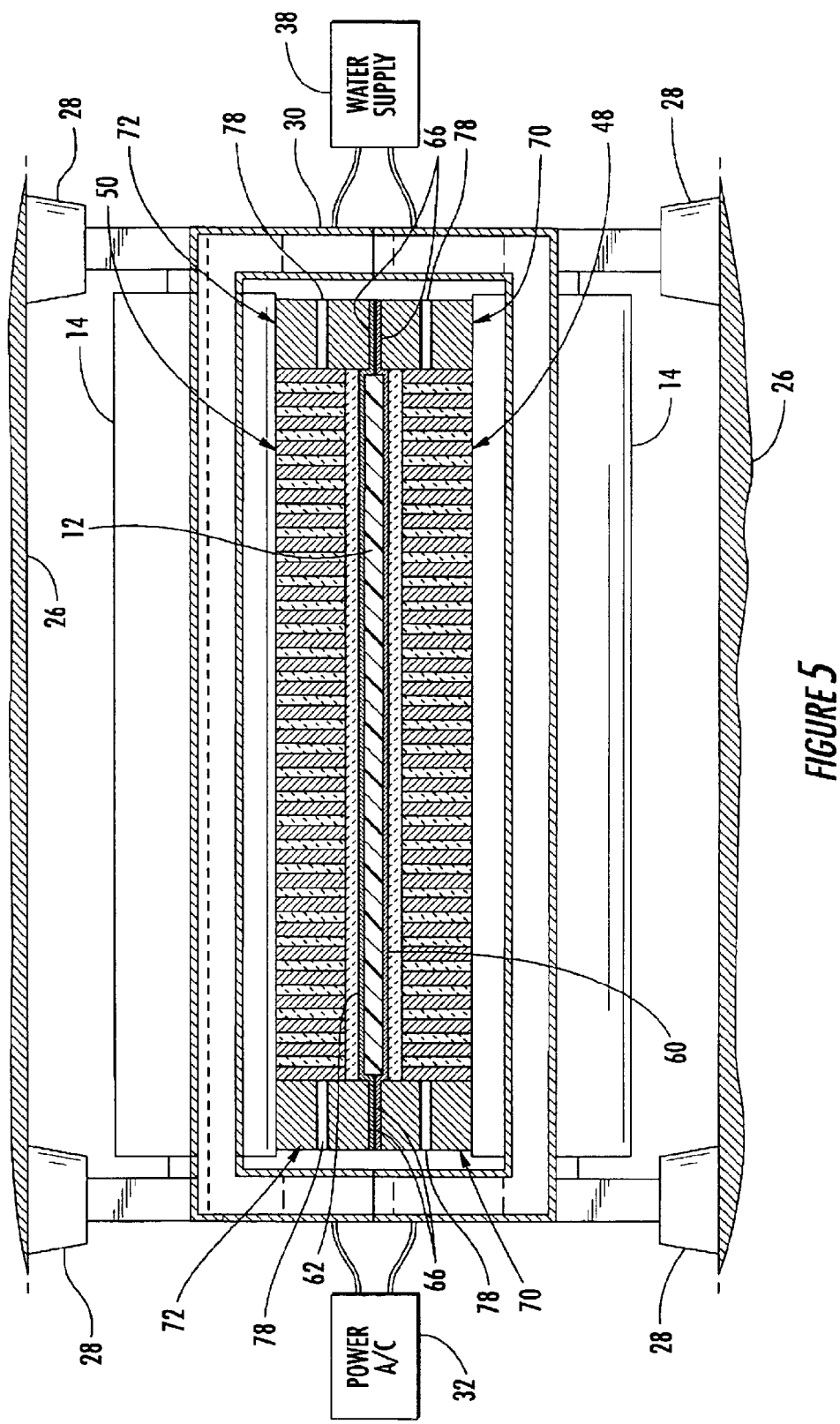

Having thus described the invention in general terms, reference will now be made to the accompanying drawings, which are not necessarily drawn to scale, and wherein:

FIG. 1 is an elevation view illustrating an apparatus for consolidating composite materials, according to one embodiment of the present invention;

FIG. 2 is a side view illustrating the right side of the apparatus of FIG. 1;

FIG. 3 a section view illustrating the apparatus of FIG. 1, as seen along line 3—3 of FIG. 1;

FIG. 4 is an elevation view illustrating an apparatus for consolidating composite materials, according to another embodiment of the present invention; and FIG. 5 is a section view illustrating the apparatus of FIG. 4, as seen along line 5—5 of FIG. 4.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings, and in particular to FIGS. 1 and 2, there is illustrated a consolidation apparatus 10, according to one embodiment of the present invention. The apparatus 10 can be used to consolidate a composite workpiece 12 by heating the workpiece 12 to a processing temperature and applying pressure to the workpiece 12. The apparatus 10 includes two pairs of consolidation rollers 14, 16 that define two nips 18, 20. During operation, the workpiece 12 is disposed between support tools 22, 24, and the tools 22, 24 and workpiece 12 are then translated longitudinally through the nips 18, 20. Induction coils 30 are also provided for heating one or more susceptors 34 disposed between the support tools 22, 24, and in thermal communication with the workpiece 12.

The term "workpiece" is not mean to be limiting, and it is understood that the workpiece 12 can be provided as a layered or otherwise nonuniform structure that includes a fibrous material and a matrix material. A variety of fibrous and matrix materials can be used. For example, the fibrous material in the workpiece 12 can be alumina-based, boron-based, carbon-based, or silicon carbide-based fibers. The fibers can be provided in a weave, braid, or non-woven arrangement. The matrix material can be a resin, such as Ultem® resin, or a metal such as titanium, aluminum, or alloys thereof. The fiber and matrix materials can be provided separately, for example, as a fibrous mat and a film of the matrix material. Alternatively, the fiber and matrix materials can be provided together, for example, as preimpregnated tapes of the fiber infused with the matrix material or as a sheet of the matrix material with fibers interposed therein. The workpiece 12 can be a sheet that corresponds to the dimensions of a particular structural member that is to be formed from the workpiece 12. Alternatively, the workpiece 12 can be a large, or continuous, sheet from which a number of structural members can be formed. After consolidation, the workpieces 12 can be cut, formed, or otherwise processed to manufacture one or more structural members such as a spar, beam, or panel, which can be used in a variety of applications, for example, as a skin or structural support in an aircraft wing aircraft fuselage, other aeronautical vehicles, buildings and other structures, and the like. The workpieces 12 can also be used to fabricate structural members for a wide variety of other applications including, without limitation, structural panels or other members for automotive or marine applications or the like. Apparatuses and methods for forming composite materials are provided in U.S. application Ser. No. 10/640,188, entitled "Forming Apparatus and Method," filed concurrently herewith, and which is assigned to the assignee of the present invention and is incorporated herein by reference.

Each of the rollers 14, 16 can be connected to a frame 26. As shown in FIG. 1, some of the rollers 16 can be freely rotatable with a substantially fixed axis, such that the rollers 16 guide the support tools 22, 24 and workpiece 12 but do not provide a substantial consolidation force. Other rollers 14 can be adjustably controlled by actuators 28 relative to the workpiece 12 to adjust the nip 18 therebetween and provide an adjustable consolidation force on the workpiece 12. Further, the actuators 28 can be configured to rotate the rollers 14, 16, thereby advancing or retracting the support tools 22, 24 and workpiece 12 through the apparatus 10. Each roller 14, 16 can be adjusted using a single one of the actuators 28, or separate actuators can be provided for rotatably and linearly adjusting the rollers 14. Each of the actuators 28 can be hydraulically, pneumatically, electrically, or otherwise powered. Preferably, the rollers 14, 16 are formed of a material such as steel that is sufficiently strong and stiff so that the rollers 14, 16 can provide a substantially uniform consolidation force on the workpiece 12.

The workpiece 12 is heated by an electromagnetic field generator such as the induction coils 30 which can include one or more solenoid coils that extend around the workpiece 12 and the support tools 22, 24, as shown in FIGS. 2 and 3. Alternatively, each induction coil 30 can be disposed entirely on one side of the workpiece 12, for example, so that first and second induction coils 30 are disposed in planes parallel to the plane of the workpiece 12, with the first induction coil 30 on one side of the workpiece 12 and the second induction coil 30 on an opposite side of the workpiece 12. Each induction coil 30 typically includes a plurality of elongate tube sections connected by curved tube sections to form coils that are positioned proximate to the workpiece 12 and the susceptor 34 in which the current is to be induced. The tube sections can be positioned uniformly relative to the susceptor 34 so that the susceptor 34 is heated substantially uniformly. The tube sections are generally formed of an electrically conductive material such as copper. Lightly drawn copper tubing can be used so that the tubing can be adjusted as necessary to correspond to the configuration of the apparatus. For example, the induction coils 30 can be formed of 1.0 inch square copper tubing with a 0.0625 inch wall thickness. Alternatively, tubular sections of other sizes and/or other cross-sectional shapes such as round or triangular tubes can be used.

The induction coil 30 is capable of being energized by one or more power supplies 32, as shown in FIG. 3. The power supply 32 provides an alternating current to the induction coil 30, e.g., between about 3 and 10 kHz. This alternating current through the induction coil 30 induces a secondary current within the susceptor 34 that heats the susceptor 34 and, thus, the workpiece 12. The temperature of the susceptor 34 and the workpiece 12 can be inferred by monitoring electrical parameters within the one or more power supplies 32, as described in U.S. application Ser. No. 10/094,494, entitled "Induction Heating Process Control," filed Mar. 8, 2002, and U.S. Pat. No. 6,528,771, entitled "System and Method For Controlling an Induction Heating Process," issued Mar. 4, 2003, each of which is assigned to the assignee of the present invention and is incorporated herein by reference.

The induction coil 30 can also define a passage for circulating a cooling fluid from a coolant source 38, for example, a water supply as shown in FIG. 3. A pump (not shown) circulates the cooling fluid from the coolant source 38 through the passage. The cooling fluid cools the induction coil 30 to maintain low electrical resistivity in the coil 30.

Preferably, the induction coils 30 or other electromagnetic field generator is configured to heat the workpiece 12 without substantially heating the support tools 22, 24, thereby reducing the time and energy required for heating and cooling. For example, each support tool 22, 24 can be substantially transparent to the electromagnetic field generated by the induction coils 30, and the susceptor 34, which is adapted to be heated by the electromagnetic field, can be provided in thermal communication with the workpiece 12. By the term "substantially transparent," it is meant that the support tools 22, 24 are configured to substantially transmit the electromagnetic field therethrough, i.e., the electromagnetic field extends through the support tools 22, 24, with little or no current being induced in the support tools 22, 24 so that each support tool 22, 24 is heated only insubstantially or not at all by the electromagnetic field. Further, the susceptor 34 can have a relatively low thermal capacity so that the susceptor 34 can be quickly heated to the processing temperature and subsequently cooled, thereby reducing or eliminating the need to cool the support tools 22, 24 between operations.

In addition to being substantially transparent to the electromagnetic field, the support tools 22, 24 are also preferably rigid and strong for supporting and compressing the workpiece 12. According to one embodiment, the support tools 22, 24 are formed of a plurality of longitudinal members, which are formed of an electrically conductive material but electrically isolated. For example, as shown in FIG. 3, each member 40 is a stainless steel plate that extends the length of the respective support tool 22, 24, about 144 inches in this case, and has cross-sectional dimensions of about 1 inch by ⅛ inch. The members 40 are arranged in a generally parallel configuration such that the members 40 extend parallel to the direction of motion of the workpiece 12 through the induction coil 30 and the nips 18, 20. The members 40 can be adhered together using an adhesive or mechanically constrained using clips, clamps, bolts, or other components. An insulative, or dielectric, material 41 such as aluminum oxide is thermal sprayed on the members 40 so that current does not flow between adjacent members 40. Other oxide-based dielectric coatings can alternatively be used, and the coatings can be painted, thermal sprayed, or otherwise disposed on the members 40.

The induction coils 30 can be tuned or otherwise configured to generate an electromagnetic field that is substantially transmitted through the particular support tools 22, 24 used in the apparatus 10. For example, in one embodiment, the induction coils 30 are configured to generate an alternating electromagnetic field at a frequency of about 3 KHz, and each of the members 40 of the support tools 22, 24 is formed of 300 series stainless steel and has at least one cross-sectional dimension that is less than about ¼ inch. Although the theoretical explanation of this phenomenon is not relied upon as a basis for patentability, it is believed that 300 stainless steel has a current depth of about ½ inch under these conditions and therefore substantially no current is induced in the members 40. Thus, the induction coils 30 induce a current within the susceptor 34 without inducing an appreciable current in the support tools 22, 24, thereby saving energy and time. Further, by limiting the temperature variation of the support tools 22, 24, thermally-induced dimensional variations in the support tools 22, 24 can also be minimized.

A faceplate 42 can be provided on the support tools 22, 24 such that the faceplates 42 are directed toward the workpiece 12 between the support tools 22, 24. The faceplates 42 can be formed of a material that exhibits little or no electromagnetic absorption such as ceramic or a composite material that has a matrix of ceramic and fibrous materials therein. The ceramic material can be an aluminum silicate binder. The faceplates 42 provide a durable liner to the support tools 22, 24 and electrically isolate the support tools 22, 24 from the workpiece 12 and susceptor 34.

The susceptor 34 can be provided as one or more thin sheets or foils that extend around the workpiece 12, as shown in FIG. 3. For example, as shown in FIGS. 2 and 3, the susceptor 34 can be disposed as sheets 34a, 34b on opposing surfaces of the workpiece 12, and the edges 36 of the sheets 34a, 34b can be engaged so that the workpiece 12 is contained within the susceptor 34. For example, the edges 36 of the sheets 34a, 34b can be bent about the edges of the workpiece 12 and engaged by pressing, crimping, welding, or otherwise electrically engaging the sheets 34a, 34b. Alternatively, a single susceptor can be wrapped around the workpiece 12, or otherwise disposed thereon, so that the susceptor(s) extend around the workpiece 12. The susceptor 34 can also be coated, for example, with an oxidation resistant nickel aluminide coating that can be flame-sprayed or otherwise disposed on the surface thereof. A description of a susceptor with a nickel aluminide coating is provided in U.S. application Ser. No. 10/032,625, entitled "Smart Susceptors with Oxidation Control," filed Oct. 24, 2001, and which is assigned to the assignee of the present invention and is incorporated herein by reference. The susceptor 34 can also be coated with a release agent that facilitates the removal of the workpiece 12 after consolidation.

Further, the susceptor 34 can be formed of a material that is characterized by a Curie temperature at which the susceptor 34 becomes paramagnetic, for example, a ferromagnetic alloy such as an alloy of iron and nickel. One such alloy, generally referred to as Kovar®, a registered trademark of CRS Holdings, Inc., includes approximately 53% iron, 29% nickel, 17% cobalt, and 0.2% chromium. Susceptors having Curie temperatures at which each susceptor becomes non-magnetic, or paramagnetic, are described in U.S. Pat. No. 5,728,309, entitled "Method for Achieving Thermal Uniformity in Induction Processing of Organic Matrix Composites or Metals," which issued on Mar. 17, 1998; U.S. Pat. No. 5,645,744, entitled "Retort for Achieving Thermal Uniformity in Induction Processing of Organic Matrix Composites or Metals," which issued on Jul. 8, 1997; and U.S. Pat. No. 5,808,281, entitled "Multilayer Susceptors for Achieving Thermal Uniformity in Induction Processing of Organic Matrix Composites or Metals," which issued on Sep. 15, 1998, each of which is assigned to the assignee of the present invention and is incorporated herein by reference.

Thus, the susceptor 34 extends around the workpiece 12, and eddy currents can be induced in the susceptor 34 by the induction coils 30. Eddy current heating of the susceptor 34 results from eddy currents that are induced in the susceptor 34 by the electromagnetic field generated by the induction coil 30. The flow of the eddy currents through the susceptor 34 results in resistive heating of the susceptor 34. According to one embodiment of the present invention, the susceptor 34 is heated by the eddy current heating to the Curie temperature of the susceptor 34, whereupon the susceptor 34 becomes paramagnetic and does not heat further. If some portions of the susceptor 34 are heated more quickly than other portions, the hotter portions will reach the Curie temperature and become paramagnetic before the other, cooler portions of the susceptor 34. The eddy currents will then flow through the cooler magnetic portions, i.e., around the hotter, paramagnetic portions of the susceptor 34, causing the cooler portions to also become heated to the Curie temperature. Therefore, even if some portions of the susceptor 34 heat at different rates, the entire width of the susceptor 34 and, therefore, the workpiece 12, is heated to a uniform Curie temperature as the workpiece 12 passes by or through the induction coil 30. The susceptor 34 can also act as a magnetic shield that prevents the induction coil 30 from inducing a current in the workpiece 12. Further, in some cases, the workpiece 12 is formed of electrically nonconductive materials that are not receptive to an induced current. As such, the induction coil 30 does not heat the workpiece 12 directly, but rather heats the susceptor 34, which, in turn, heats the workpiece 12.

The Curie temperature of the susceptor 34 can correspond to the processing temperature of the workpiece 12, i.e., the temperature at which the workpiece 12 can be consolidated. For example, the Curie temperature of the susceptor 34 can be equal to the processing temperature or slightly greater than the processing temperature so that the workpiece 12 is heated to the processing temperature when the susceptor 34 is heated to the Curie temperature. The processing temperature of the workpiece 12 can be equal to the melting temperature of the matrix material or otherwise sufficiently high that the workpiece 12 can be consolidated at the processing temperature. Thus, the susceptor 34 can be used to heat the workpiece 12 uniformly to the processing temperature so that the workpiece 12 can be consolidated by the pressure applied by the rollers 14. The susceptor 34 can be formed of a variety of materials, and the composition of the susceptor 34 can be designed to achieve a desired Curie temperature that corresponds to the processing temperature of a particular type of composite material. For example, in one embodiment, the susceptor 34 is formed of Kovar®, which has a Curie temperature of about 750° F., at which temperature Ultem® resin can be melted and consolidated with fibrous materials such as graphite to form a composite structure.

The workpiece 12 can be heated by the induction coil 30 to the processing temperature and consolidated by the rollers 14 contemporaneously with or shortly after heating. For example, the induction coils 30 can be situated relative to the rollers 14 such that the workpiece 12 is advanced from the induction coils 30 to the rollers 14, i.e., toward the right as shown in FIG. 1. Due to the stiffness of the support tools 22, 24, the rollers 14 apply pressure to consolidate the workpiece 12 over an area that is greater than the area of contact between the rollers 14 and the support tools 22, 24. According to one embodiment, the susceptor 34 has a low thermal capacity so that the susceptor 34 and workpiece 12 are at least partially cooled while being consolidated by the roller 14.

According to another embodiment of the present invention illustrated in FIGS. 4 and 5, the apparatus 10 can be used to continuously consolidate a composite workpiece 12, i.e., the composite workpiece 12 can be provided continuously during operation of the apparatus 10 and the workpiece 12 can have any length. The workpiece 12 can be formed of a plurality of preimpregnated tapes 44 that are dispensed from rolls 46. As is known in the art, preimpregnated tapes are strips of composite material that include fibers impregnated with a matrix material. Any number of tapes 44 can be disposed continuously between first and second support tracks 48, 50 to form the desired thickness and width of the workpiece 12 therebetween. Alternatively, the rolls 46 can be continuous sheets of fibrous and matrix materials that are layered and used for a combination resin-infusion and consolidation process in the apparatus 10. For example, multiple carbon fiber mats can be layered alternately with sheets of resin film so that the apparatus 10 melts the resin, infuses the resin in the carbon mats, and consolidates the resulting composite workpiece 12.

The support tracks 48, 50 can be formed of links 52 that are rotatably connected to form an endless track. Each link 52 can be similar to one of the support tools 22, 24 described above, including multiple electrically isolated members 40. Adjacent links 52 are hinged or otherwise rotatably connected such that the adjacent links 52 can be rotated or articulated at least in one direction. The tracks 48, 50 are supported by track guides 54, which can be rotatable rollers that guide the tracks 48, 50. The guides 54 can be mounted to the frame 26 and can also maintain tension in the tracks 48, 50.

As also shown in FIG. 4, the susceptor 34 can be provided as first and second susceptor sheets 60, 62 that are passed continuously through the nips 18, 20 of the apparatus 10. The susceptor sheets 60, 62 can be endless loops, as shown, and can be supported by susceptor loop guides 64 that guide the susceptor sheets 60, 62 through the apparatus 10. Each susceptor sheet 60, 62 can extend around a respective one of the support tracks 48, 50 so that the susceptor sheet 60, 62 extends between the tracks 48, 50 in the nips 18, 20. Similar to the track guides 54, the susceptor guides 64 can be mounted to the frame 26 and can maintain tension in the susceptor sheets 60, 62.

Additionally, continuous susceptor engagement tracks 70, 72 can be provided for one or both of the susceptor sheets 60, 62. The susceptor engagement tracks 70, 72 can be provided on both sides of the workpiece 12 and can be guided by track guides 74, such as rotatable rollers similar to the guides 54, 64. Each engagement track 70, 72 can be formed of a plurality of articulated links 76, for example, with hinge connections therebetween, and the engagement tracks 70, 72 can be endless. As shown in FIG. 5, the engagement tracks 70, 72 can be received in the nips 18, 20 between the rollers 14, 16 so that the engagement tracks 70, 72 are urged together between the rollers 14 and press the edges 66 of the susceptor sheets 60, 62 together. The links 76 can be formed of a variety of materials including metals such as copper, and the links 76 can be stiff so that the links 76 exert a substantially uniform pressure on the edges 66 of the susceptor sheets 60, 62 over the length of the links 76. Some or all of the engagement tracks 70, 72 can also include an inflatable bladder 78 that is fluidly connected to a pressurized fluid source (not shown) for pressurizing and expanding the bladder 78 to maintain a compressive force on the edges 66 of the susceptor sheets 60, 62. Preferably, the bladders 78 are formed of a pliable material that can withstand the temperatures associated with consolidating the workpiece 12. The fluid source can be a pressure generation device, such as a compressor, or the source can be a pressure vessel that contains the pressurized fluid such as air, argon, or other inert gases. The fluid source can include a pressure regulation device in fluid communication with each of the bladders 78 and configured to maintain a substantially equal pressure in each bladder 78. Further, a cooling fluid can be circulated through the bladders 78, through other passages in the links 76, or otherwise in contact with the links 76 to cool the links 76. Other mechanisms can alternatively be provided for urging the edges 66 of the susceptor sheets 60, 62 into electrical contact.

The operations for consolidating a workpiece 12 according to one embodiment of the present invention will now be described. It is understood that one or more of the operations can be omitted according to other embodiments of the present invention. The method includes providing the support tools 22, 24 in a face-to-face, opposing relationship and disposing at least one susceptor 34 and the workpiece 12 between the support tools 22, 24. The workpiece 12 can be disposed, for example, as a plurality of continuous preimpregnated tapes, or fibrous mats and resin films, that are disposed between two continuous layers 60, 62 of the susceptor 34. Additionally, the support tools 22, 24 can be provided as continuous or endless members or tracks 48, 50. Thus, the workpiece 12 and susceptors 60, 62 can be disposed between the support tracks 48, 50, which are passed continuously through the nips 18, 20. Bladders 78 in communication with the transverse edges 66 of the susceptors 60, 62 are inflated to urge the edges 66 into electrical contact. An electromagnetic field is generated to induce an electric current in the susceptors 60, 62 and heat the susceptors 60, 62 and the workpiece 12 to a processing temperature. For example, an induction coil 30 can be energized to generate the electromagnetic field and heat the susceptors 60, 62 to the Curie temperature, above which the susceptors 60, 62 becomes paramagnetic. Preferably, the electromagnetic field is substantially transmitted through the support tracks 60, 62. The workpiece 12, susceptors 60, 62, and support tracks 60, 62 are advanced through the nip 18 between the rollers 14 so that the workpiece 12 is consolidated.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of consolidating a workpiece, the method comprising:

providing first and second support tools in a face-to-face, opposing relationship;

disposing at least one susceptor and workpiece between the support tools;

generating an electromagnetic field, thereby inducing an electric current in the susceptors and heating the susceptors and the workpiece to a processing temperature, the support tools being substantially transparent to the electromagnetic field such that the electromagnetic field is substantially transmitted through the support tools; and advancing the workpiece, susceptors, and support tools through a nip and thereby consolidating the workpiece.

2. A method according to claim 1 wherein said providing step comprises providing first and second support tracks having rotatable links.

3. A method according to claim 1 wherein said disposing step comprises disposing a workpiece between opposed layers of the susceptor.

4. A method according to claim 1 wherein said disposing step comprises disposing a plurality of preimpregnated tapes to form thin workpiece.

5. A method according to claim 1 wherein said disposing step comprises disposing a plurality of layered fibrous mats and resin films to form the workpiece.

6. A method according to claim 1 wherein said disposing step comprises disposing a continuous workpiece.

7. A method according to claim 1 wherein said disposing step comprises disposing at least one continuous susceptor.

8. A method according to claim 1 wherein said generating step comprises heating the susceptor to a Curie temperature above which the susceptor becomes paramagnetic, the Curie temperature corresponding to the processing temperature of the workpiece.

9. A method according to claim 1 wherein said generating step comprises energizing an induction coil extending proximate to the workpiece and the susceptor to generate the electromagnetic field.

10. A method according to claim 1 wherein said consolidating step comprises advancing the workpiece, susceptors, and support tools through a nip formed between at least two rollers.

11. A method according to claim 1 further comprising engaging at least two transverse edges of the susceptor into electrical contact at a location proximate to the electromagnetic field generator such that a current induced in the susceptors by the electromagnetic field generator flows between the susceptors.

12. A method according to claim 11 further comprising inflating a bladder in communication with the transverse edges to urge the edges together.

13. A method according to claim 1 wherein said disposing step comprises disposing continuous support tools.

14. A method of consolidating a workpiece, the method comprising:

providing first and second support tools in a face-to-face, opposing relationship as first and second support tracks having rotatable links;

disposing at least one susceptor and workpiece between the support tools;

generating an electromagnetic field, thereby inducing an electric current in the susceptors and heating the susceptors and the workpiece to a processing temperature, the support tools being substantially transparent to the electromagnetic field such that the electromagnetic field is substantially transmitted through the support tools; and consolidating the workpiece.

15. A method of consolidating a workpiece, the method comprising:

providing first and second support tools in a face-to-face, opposing relationship;

disposing at least one susceptor and workpiece between the support tools;

engaging at least two transverse edges of the susceptor into electrical contact at a location proximate to the electromagnetic field generator such that a current induced in the susceptors by the electromagnetic field generator flows between the susceptors, thereby inflating a bladder in communication with the transverse edges to urge the edges together;

generating an electromagnetic field, thereby inducing an electric current in the susceptors and heating the susceptors and the workpiece to a processing temperature, the support tools being substantially transparent to the electromagnetic field such that the electromagnetic field is substantially transmitted through the support tools; and consolidating the workpiece.

* * * * *

UNITED STATES PATENT AND TRADEMARK OFFICE
CERTIFICATE OF CORRECTION

PATENT NO. : 6,906,300 B2
DATED : June 14, 2005
INVENTOR(S) : Brown et al.

It is certified that error appears in the above-identified patent and that said Letters Patent is hereby corrected as shown below:

Column 9,
Line 57, "thin" should read -- the --.

Signed and Sealed this

Thirtieth Day of August, 2005

JON W. DUDAS
*Director of the United States Patent and Trademark Office*